United States Patent
Tu et al.

(10) Patent No.: US 11,506,535 B1
(45) Date of Patent: Nov. 22, 2022

(54) DIFFRACTION GRATING DESIGN

(71) Applicant: Apple Inc., Cupertino, CA (US)

(72) Inventors: Yongming Tu, Redwood City, CA (US); Alfredo Bismuto, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/014,902

(22) Filed: Sep. 8, 2020

Related U.S. Application Data

(60) Provisional application No. 62/897,553, filed on Sep. 9, 2019.

(51) Int. Cl.
| | |
|---|---|
| *G01J 3/28* | (2006.01) |
| *G01J 3/18* | (2006.01) |
| *G02B 27/42* | (2006.01) |
| *G01J 3/20* | (2006.01) |
| *G02B 6/34* | (2006.01) |
| *G02B 5/18* | (2006.01) |

(52) U.S. Cl.
CPC ............ *G01J 3/1809* (2013.01); *G01J 3/20* (2013.01); *G01J 3/28* (2013.01); *G02B 5/1861* (2013.01); *G02B 6/34* (2013.01); *G02B 27/4233* (2013.01)

(58) Field of Classification Search
CPC .... G01J 3/1809; G01J 3/28; G01J 3/20; G01J 3/02; G02B 27/4233; G02B 5/1861; G02B 6/34
See application file for complete search history.

(56) References Cited

U.S. PATENT DOCUMENTS

| | | |
|---|---|---|
| 5,287,376 A | 2/1994 | Paoli |
| 5,488,678 A | 1/1996 | Taneya |
| 5,644,667 A | 7/1997 | Tabuchi |
| 5,742,631 A | 4/1998 | Paoli |

(Continued)

FOREIGN PATENT DOCUMENTS

| | | |
|---|---|---|
| EP | 1403985 | 3/2004 |
| EP | 1432045 | 6/2004 |

(Continued)

OTHER PUBLICATIONS

Gonzalez-Sanchez et al., "Capacitive Sensing for Non-Invasive Breathing and Heart Monitoring in Non-Restrained, Non-Sedated Laboratory Mice," Sensors 2016, vol. 16, No. 1052, pp. 1-16.

(Continued)

*Primary Examiner* — Abdullahi Nur
(74) *Attorney, Agent, or Firm* — Brownstein Hyatt Farber Schreck, LLP

(57) ABSTRACT

Configurations for a diffraction grating design and methods thereof are disclosed. The diffraction grating system can include an input waveguide located at a first location on or near a Rowland circle and multiple output waveguides located at a second and third location on or near the Rowland circle. The input waveguide may be located between the output waveguides and this configuration of input and output waveguides can reduce the footprint size of the device. In some examples, the optical component can function as a de-multiplexer. Additionally, the optical component may separate the input wavelength band into two output wavelength bands which are separated from one another by approximately 0.1 μm.

18 Claims, 7 Drawing Sheets

(56) References Cited

U.S. PATENT DOCUMENTS

| | | | |
|---|---|---|---|
| 5,818,989 | A | 10/1998 | Nakamura |
| 6,122,042 | A | 9/2000 | Wunderman et al. |
| 6,330,378 | B1 | 12/2001 | Forrest |
| 6,393,185 | B1 | 5/2002 | Deacon |
| 6,594,409 | B2 | 7/2003 | Dutt et al. |
| 6,628,686 | B1 | 9/2003 | Sargent |
| 6,657,723 | B2 | 12/2003 | Cohen |
| 6,795,622 | B2 | 9/2004 | Forrest |
| 6,892,449 | B1 | 5/2005 | Brophy et al. |
| 6,940,182 | B2 | 9/2005 | Hilton et al. |
| 6,947,639 | B2 | 9/2005 | Singh |
| 6,952,504 | B2 | 10/2005 | Bi |
| 6,954,568 | B2 | 10/2005 | Liu |
| 6,987,906 | B2 | 1/2006 | Nakama et al. |
| 7,054,517 | B2 | 5/2006 | Mossberg |
| 7,058,245 | B2 | 6/2006 | Farahi |
| 7,079,715 | B2 | 7/2006 | Kish |
| 7,203,401 | B2 | 4/2007 | Mossberg |
| 7,203,426 | B2 | 4/2007 | Wu et al. |
| 7,209,611 | B2 | 4/2007 | Joyner |
| 7,245,379 | B2 | 7/2007 | Schwabe |
| 7,283,694 | B2 | 10/2007 | Welch |
| 7,314,451 | B2 | 1/2008 | Halperin et al. |
| 7,327,918 | B2 | 2/2008 | Yamazaki et al. |
| 7,366,364 | B2 | 4/2008 | Singh |
| 7,447,393 | B2 | 11/2008 | Yan |
| 7,460,742 | B2 | 12/2008 | Joyner |
| 7,477,384 | B2 | 1/2009 | Schwabe |
| 7,483,599 | B2 | 1/2009 | Dominic et al. |
| 7,526,007 | B2 | 4/2009 | Chua et al. |
| 7,558,301 | B2 | 7/2009 | Lin et al. |
| 7,680,364 | B2 | 3/2010 | Nilsson |
| 7,720,328 | B2 | 5/2010 | Yan |
| 7,885,302 | B2 | 2/2011 | Eberhard |
| 7,885,492 | B2 | 2/2011 | Welch |
| 7,974,504 | B2 | 7/2011 | Nagarajan |
| 8,300,994 | B2 | 10/2012 | Welch et al. |
| 8,559,775 | B2 | 10/2013 | Babie et al. |
| 8,564,784 | B2 | 10/2013 | Wang et al. |
| 8,724,100 | B1 | 5/2014 | Asghari et al. |
| 8,920,332 | B2 | 12/2014 | Hong et al. |
| 8,983,250 | B2 | 3/2015 | Black et al. |
| 9,020,004 | B2 | 4/2015 | Jeong |
| 9,031,412 | B2 | 5/2015 | Nagarajan |
| 9,110,259 | B1 | 8/2015 | Black |
| 9,135,397 | B2 | 9/2015 | Denyer et al. |
| 9,217,669 | B2 | 12/2015 | Wu et al. |
| 9,348,154 | B2 | 5/2016 | Hayakawa |
| 9,370,689 | B2 | 6/2016 | Guillama et al. |
| 9,405,066 | B2 | 8/2016 | Mahgerefteh |
| 9,543,736 | B1 | 1/2017 | Barwicz et al. |
| 9,620,931 | B2 | 4/2017 | Tanaka |
| 9,766,370 | B2 | 9/2017 | Aloe et al. |
| 9,804,027 | B2 | 10/2017 | Fish et al. |
| 9,829,631 | B2 | 11/2017 | Lambert |
| 9,880,352 | B2 | 1/2018 | Florjanczyk |
| 9,943,237 | B2 | 4/2018 | Baker et al. |
| 9,948,063 | B2 | 4/2018 | Caneau et al. |
| 10,009,668 | B2 | 6/2018 | Liboiron-Ladouceur |
| 10,132,996 | B2 | 11/2018 | Lambert |
| 10,238,351 | B2 | 3/2019 | Halperin et al. |
| 10,285,898 | B2 | 5/2019 | Douglas et al. |
| 10,310,196 | B2 | 6/2019 | Hutchison |
| 10,359,571 | B2 | 7/2019 | Horth |
| 10,429,597 | B2 | 10/2019 | ten Have et al. |
| 10,529,003 | B2 | 1/2020 | Mazed |
| 10,687,718 | B2 | 6/2020 | Allee et al. |
| 10,852,492 | B1 | 12/2020 | Vermeulen et al. |
| 11,231,319 | B1 | 1/2022 | Tu et al. |
| 2003/0091265 | A1 | 5/2003 | Lin et al. |
| 2005/0053112 | A1 | 3/2005 | Shams-Zadeh-Amiri |
| 2005/0063431 | A1 | 3/2005 | Gallup et al. |
| 2005/0151966 | A1* | 7/2005 | Packirisamy ......... B82Y 20/00 356/328 |
| 2006/0002443 | A1 | 1/2006 | Farber et al. |
| 2008/0044128 | A1 | 2/2008 | Kish et al. |
| 2008/0310470 | A1 | 12/2008 | Ooi et al. |
| 2012/0002924 | A1 | 1/2012 | Okayama |
| 2014/0029943 | A1 | 1/2014 | Mathai et al. |
| 2014/0233891 | A1* | 8/2014 | Pottier ............... G02B 6/12007 385/37 |
| 2016/0224750 | A1 | 8/2016 | Kethman et al. |
| 2017/0164878 | A1 | 6/2017 | Connor |
| 2019/0339468 | A1 | 11/2019 | Evans |
| 2019/0342009 | A1 | 11/2019 | Evans |
| 2020/0152615 | A1 | 5/2020 | Krasulick et al. |
| 2020/0244045 | A1 | 7/2020 | Bismuto et al. |
| 2020/0253547 | A1 | 8/2020 | Harris et al. |
| 2020/0309593 | A1 | 10/2020 | Bismuto et al. |
| 2021/0033805 | A1 | 2/2021 | Bishop et al. |
| 2022/0091338 | A1 | 3/2022 | Tu et al. |
| 2022/0099889 | A1 | 3/2022 | Arbore et al. |

FOREIGN PATENT DOCUMENTS

| | | |
|---|---|---|
| JP | H04204508 | 7/1992 |
| JP | H06003709 | 1/1994 |
| JP | 2007279240 | 10/2007 |
| JP | 2008262118 | 10/2008 |
| WO | WO 01/014929 | 3/2001 |
| WO | WO 04/031824 | 4/2004 |
| WO | WO 05/091036 | 9/2005 |
| WO | WO 11/090274 | 7/2011 |
| WO | WO 17/040431 | 3/2017 |
| WO | WO 17/184420 | 10/2017 |
| WO | WO 17/184423 | 10/2017 |
| WO | WO 19/152990 | 8/2019 |
| WO | WO 20/106974 | 5/2020 |

OTHER PUBLICATIONS

Kybartas et al., "Capacitive Sensor for Respiratory Monitoring," Conference "Biomedical Engineering," Nov. 2015, 6 pages.

Lapedus, "Electroplating IC Packages—Tooling challenges increase as advanced packaging ramps up," *Semiconductor Engineering*, https://semiengineering.com/electroplating-ic-packages, Apr. 10, 2017, 22 pages.

Materials and Processes for Electronic Applications, Series Editor: James J. Licari, AvanTeco, Whittier, California, Elsevier Inc., 2009, 20 pages.

Worhoff et al., "Flip-chip assembly for photonic circuits," MESA+ Research Institute, University of Twente, Integrated Optical MicroSystems Group, The Netherlands, 12 pages.

U.S. Appl. No. 16/650,804, filed Mar. 25, 2020, Arbore et al.
U.S. Appl. No. 17/254,810, filed Dec. 21, 2020, Bishop et al.
U.S. Appl. No. 17/725,418, filed Apr. 20, 2022, Wu et al.
U.S. Appl. No. 17/851,252, filed Jun. 28, 2022, Wu.

He et al., "Integrated Polarization Compensator for WDM Waveguide Demultiplexers," IEEE Photonics Technology Letters vol. 11, No. 2, Feb. 1999, pp. 224-226.

Krubhakar et al., "Design and fabrication of integrated optical 1×8 power splitter in SOI substrate using large cross-section single-mode waveguides," Photonics 2010: Tenth International Conference on Fiber Optics and Photonics, Proceeding of SPIE, Bellingham, Washington, vol. 8173, No. 1, Dec. 29, 2010, pp. 1-6.

* cited by examiner

DIFFRACTION GRATING DESIGN

CROSS-REFERENCE TO RELATED APPLICATION

This application is a nonprovisional of and claims the benefit under 35 U.S.C. § 119(e) of U.S. Provisional Patent Application No. 62/897,553, filed Sep. 9, 2019, and entitled "Echelle Grating Design," the contents of which are incorporated herein by reference as if fully disclosed herein.

FIELD

This disclosure relates generally to an optical system with emitting and receiving waveguides and an Echelle grating. More particularly, embodiments herein relate to an optical system for multiplexing or de-multiplexing via emitting and receiving waveguides and an Echelle grating.

BACKGROUND

Diffraction gratings may be used in various optical instruments such as monochromators, lasers, or for holographic memory. An Echelle grating is one type of diffraction grating where the input light travels through a medium and multi-path interference of light can cause the wavelengths of the reflected light to combine or separate. The different optical paths traveled by the light can lead to phase errors.

The diffraction grating design can affect the design and performance of an optical component, such as the spacing between the input and output channels of the optical component, which can lead to unwanted channel crosstalk. Additionally, small variations in the reflective facets of the diffraction grating caused by imperfections in the grating material may generate optical losses and deviations in the reflected light.

SUMMARY

Embodiments of the systems, devices, methods, and apparatuses described in the present disclosure are directed to a photonics device for de-multiplexing light. Also described are systems, devices, methods, and apparatuses directed to receiving light in a wavelength range and outputting light in a first wavelength band and a second wavelength band, which may be separated by at least 0.1 µm. An input waveguide may provide the light through a planar waveguide and reflect off of a diffraction grating, as a first output light received by a first output waveguide and a second output light received by a second output waveguide. The input waveguide may be positioned between the first and second output waveguides.

In some examples, the present disclosure describes an optical device. The optical device may include a planar waveguide that defines an input light path, an input waveguide, and a set of grating facets. The input waveguide may emit light along the input light path and the set of grating facets may receive the emitted light from the input waveguide and may reflect the emitted light as a first reflected light and a second reflected light. The optical device may include a first output waveguide defining a first reflected light path and configured to receive the first reflected light along the first reflected light path and a second output waveguide defining a second reflected light path and configured to receive the second reflected light along the second reflected light path. In some examples, the input waveguide may be located between the first output waveguide and the second output waveguide and the emitted light may be in a broadband wavelength range. In some examples the first reflected light may be in a first wavelength range and the second reflected light may be in a second wavelength range spaced apart from the first wavelength range by at least 0.1 µm.

In some examples, the input waveguide may be located at a first position on a Rowland circle, the first output waveguide may be located at a second position on the Rowland circle, and the second output waveguide may be located at a third position on the Rowland circle. In some examples, the set of grating facets may reflect a first wavelength range of light at a first angle and to the first output waveguide and may reflect a second wavelength range of light at a second angle and to the second output waveguide, where the first angle is equal to the second angle. In some examples, the first angle may be between the input light path and at least one of first or second output light paths, and the first angle may be selected such that an optical loss associated with the first wavelength range of light is equal to an optical loss associated with the second wavelength range of light. In still further examples, a power distribution of the first wavelength range of light may be received by the first output waveguide, and the second wavelength range of light received by the second output waveguide is based at least in part on a blaze angle of the set of grating facets.

In some examples, the present disclosure describes an optical device. The optical device may include a light emitting element, a light receiving element and a diffraction grating. The light emitting element may emit input light along an input light path and positioned at a first location on a Rowland circle. The light receiving element may receive reflected light along a reflected light path and positioned at a second location on the Rowland circle. The diffraction grating may receive light from the light emitting element, traveling along its input light path, and may reflect light along the reflected light path to the light receiving element. In some examples, the reflected light path is a first reflected light path, the light receiving element is a first light receiving element, and the optical device may include a second light receiving element configured to receive reflected light along a second reflected light path. Continuing the example, at least a subset of a set of grating mirrors may be configured to receive light in a first wavelength band of light, and the first wavelength band of light may include a second wavelength band of light reflected along the first reflected light path to the first light receiving element and a third wavelength band of light separated from the second wavelength band of light, the third wavelength band of light reflected along a third reflected light path to the second light receiving element. Additionally, the input light path is located between the reflected light path and the second reflected light path. In some examples, the second wavelength band of light and the third wavelength band of light may have approximately equal average transmission powers. In some examples, the second wavelength band of light may be spaced apart from the third wavelength band of light by a 0.1 µm separation wavelength band. In some examples, the diffraction grating is an Echelle grating.

In some examples, the light emitting element may be a first light emitting element, the input light may be a first input light, the input light path may be a first input light path, the optical device may include a second light emitting element that may emit second input light along a second input light path, and the light receiving element may be located between the first light emitting element and the second light emitting element. In still further examples, the light receiving element may be a first light receiving element, the reflected light path may be a first reflected light path, and the optical device may include a second light receiving element that may receive second reflected light on a second reflected light path. In still further examples, the light receiving element may be a first light receiving element, the reflected light path may be a first reflected light path, the reflected light is a first reflected light, and the optical device may include a second light receiving element that may receive second reflected light on a second reflected light path, where the first light receiving element and the second light receiving element are both located on a first side of the light emitting element. In some examples, the optical device may include a doped material positioned between the light emitting element and the light receiving element.

In some examples, the present disclosure describes a method for splitting light. The method may include emitting light in a broadband wavelength range, reflecting the light from an Echelle grating in the broadband wavelength range, receiving a first reflected light in a first wavelength band, and receiving a second reflected light in a second wavelength band, the second wavelength band separated from the first wavelength band by at least 0.1 μm. In some examples, the method may include emitting light on an optical path between a first reflected optical path and a second reflected optical path. In some examples, the method may include emitting light comprises emitting light from a first position on a Rowland circle, receiving the first reflected light comprises receiving the first reflected light at a second position on the Rowland circle, and receiving the second reflected light comprises receiving the second reflected light at a third position on the Rowland circle. In some examples, the first position on the Rowland circle may be between the second position and the third position.

Figure 1:
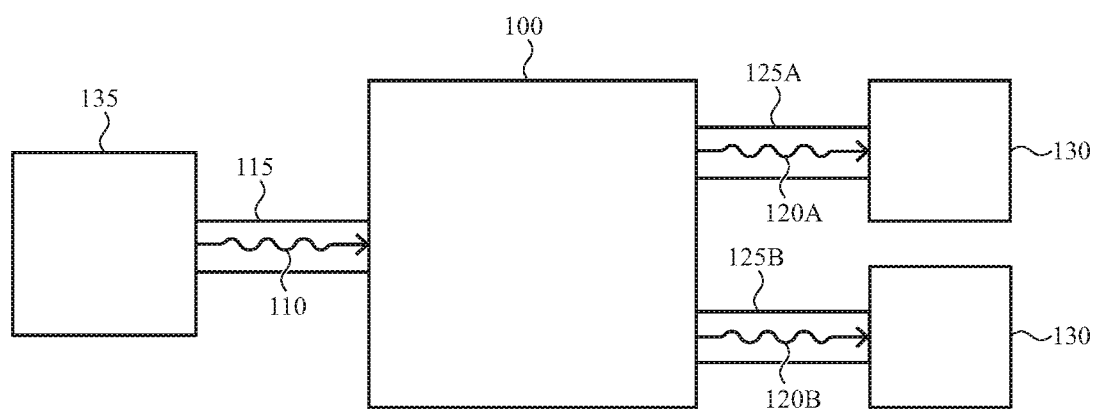
FIG. 1 illustrates a block diagram of an optical component.

It should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Generally, diffraction gratings may be designed to reduce channel crosstalk, phase errors, and optical losses to the input and output light. Different factors that may be considered when designing an optical component with a diffraction grating may include, but are not limited to, the positioning of the input waveguide(s) and the output waveguide(s) relative to one another, the radius of curvature of the diffraction grating, the input and output wavelength(s), the angle between the input waveguide(s) and the output waveguide(s), and so forth. In some examples, the input waveguide(s) and the output waveguide(s) may provide a reduced footprint size of the diffraction grating.

Additionally, the performance of the diffraction grating may be sensitive to the quality of the reflector facets, also known as the facets, or the grating teeth. The terms "reflector facets," "teeth," "grating teeth," and "facets," may be used interchangeably herein. The fabrication of the diffraction grating may affect the size of the reflective facets as defining the facets in a planar substrate may be difficult, especially when the reflective teeth have a small width and/or small height. The fabrication process may produce corner effects, such as rounded corners, that can cause undirected scattering of light.

Disclosed herein are optical components including a diffraction grating. The optical component may include a diffraction grating, an input waveguide(s) and an output waveguide(s). The input waveguide may be located between the output waveguides and all of the waveguides may be located on or near a Rowland circle. The placement of the first location(s) between the second location(s) (or vice versa) can reduce the footprint size of the device.

In some examples, the diffraction grating can be a demultiplexer that separates the input wavelength band of light into at least two output wavelength bands of light that are separated from one another. In some examples, the optical component may have angles between the input and output waveguides that are similar or are the same. Similar angles between the input and output waveguides may produce similar optical losses of the different wavelength bands. The angle selection can reduce the differences in average transmissions between the different wavelength bands and can increase the diffraction efficiency.

In some examples, the width, height, and blaze angle of the reflective facets can be tuned to lead to easier fabrication, to reduce the amount of fluctuations in optical losses, to reduce the size of the device, and so forth.

These and other embodiments are discussed below with reference to FIGS. 1-6. However, those skilled in the art will readily appreciate that the detailed description given herein with respect to these Figures is for explanatory purposes only and should not be construed as limiting.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

FIG. 1 illustrates a block diagram of an optical component. In FIG. 1, the optical component 100 may be a de-multiplexer that may receive input light 110 from a light source 135 and route the received light to output light 120, which may be received by a detector 130. The input light 110 may be a single input and the output light 120 may include two or more outputs such as output light 120A and output light 120B. Where discussed herein, the output light may be labeled generally as the output light 120, and individual instances or components with a separate element number such as output light 120A and output light 120B, and so forth. Although the light source 135 is depicted as emitting light directly into the de-multiplexer, there may be additional optical components between the light source 135 and the de-multiplexer, and there may not be direct optical coupling between the de-multiplexer and the detector 130.

The optical component 100 may separate the output light 120 and the light separation may be wavelength dependent. The light may be separated and output as individual wavelengths or wavelength bands. In some examples, the input light 110 may be in a wavelength range of approximately 1.3 µm-2.5 µm and the output light 120A and 120B may be in two separate wavelength bands, both of which may be within the input light wavelength range. The separation of the input light will be discussed in further detail with reference to FIGS. 2-5B.

The input light 110 may be provided by an input waveguide 115 and the output light 120 may be received by output waveguides 125A and 125B. As discussed herein, the output waveguides may be referred to as output waveguides 125 or individually with a separate element number for each output waveguide such as output waveguide 125A and 125B. In some examples, the input and output waveguides may be strip waveguides. Although the input light 110 may be discussed as emitting light into the optical component 100, it may be understood that a light source not illustrated in FIG. 1 may provide light to the input waveguide 115. Similarly, the output waveguides 125 may be discussed as receiving output light 120, but the output waveguides 125 may provide the output light 120 to one or more light detectors that are not illustrated in FIG. 1. The detector(s) can include any type of diode that can respond to or measure photons impinging on its active area. The detector(s) can generate one or more detector signals indicative of the output light.

Optical Component with a Diffraction Grating

Figure 2:
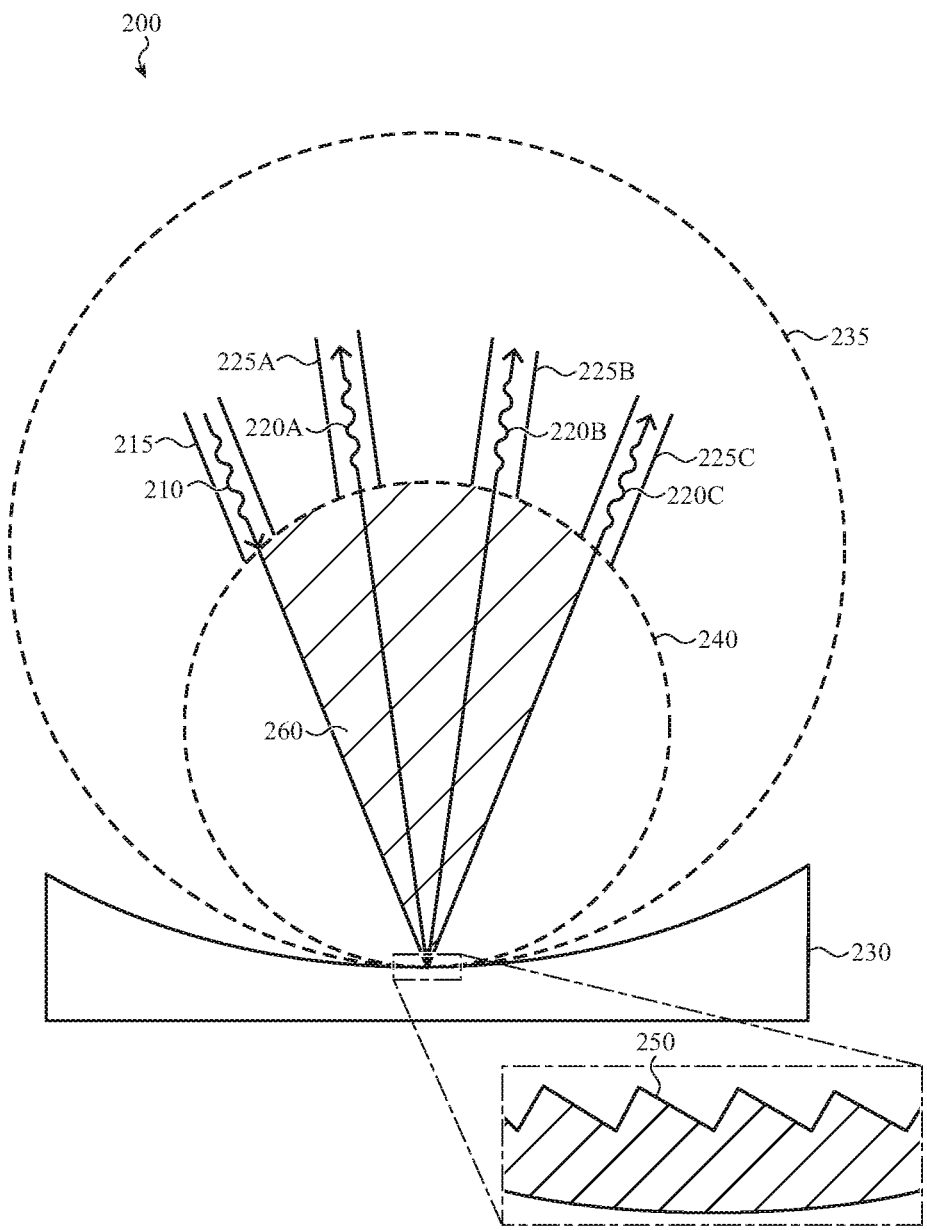
FIG. 2 illustrates a simplified optical component with a diffraction grating.

FIG. 2 illustrates a simplified optical component with a diffraction grating. The optical component 200 of FIG. 2 may include an input waveguide 215, multiple output waveguides 225, and a diffraction grating 230. As illustrated in FIG. 2, the diffraction grating 230 may have a radius of curvature that is associated with an imaginary diffraction grating circle 235. The radius of curvature of the diffraction grating 230 may also be associated with another imaginary circle referred to herein as the Rowland circle 240. The Rowland circle 240 has a diameter that is approximately equal to the radius of the diffraction grating circle 235. In some examples, the input waveguide 215 and the output waveguides 225A, 225B, and 225C may be on the Rowland circle 240. When the input waveguide 215 emits input light 210 from somewhere on the Rowland circle 240 and toward the diffraction grating 230, then a beam reflecting off of the diffraction grating 230 may be split into reflected beams that may come into focus at other points on the Rowland circle 240. The single input waveguide and the three output waveguides are used for explanatory purposes only, as the optical component 200 may include one or more input waveguides and one or more output waveguides as appropriate. Additionally, the positioning of the input and output waveguides with respect to each other will be discussed in further detail with respect to FIGS. 3A-4C.

In FIG. 2, for explanatory purposes only, the input waveguide 215 is located at a first position and the output waveguides 225 are located all to one side of the input waveguide 215; however, in other examples, the input and output waveguides may be arranged in different configurations. In some examples and as discussed with reference to FIGS. 3A-4C, the output waveguides 225 may be located on both sides of the input waveguide 215, there may be two input waveguides 215 that may be located on both sides of an output waveguide 225, and so forth.

The input waveguide 215 may emit input light 210 into a planar waveguide or slab waveguide 260, where the slab waveguide is represented by the shaded area. In FIG. 2, the slab waveguide 260 is defined by the optical path of the input light optical path and the optical path of the output light. Although the shaded area in FIG. 2 depicts the slab waveguide 260, in some examples, the slab waveguide 260 may extend outside of the shaded area of FIG. 2. In some examples, the area outside of the slab waveguide 260 may be a doped material to prevent the attenuation of input light and output light. The terms "planar waveguide" and "slab waveguide" may be used interchangeably herein.

In some examples, the input light 210 may be received by the input waveguide 215 from one or more light emitters (not shown in FIG. 2), and the input light 210 may propagate from the input waveguide 215 into the slab waveguide 260 toward the diffraction grating 230. The slab waveguide 260 may be optically coupled to the diffraction grating 230, so that the slab waveguide 260 may emit light that will reflect off of the diffraction grating 230. The input light 210 may then reflect off of the diffraction grating 230 and output light 220A, 220B, and 220C, and after being reflected may propagate back through the slab waveguide 260 toward the output waveguides 225A, 225B, and 225C, respectively. As previously discussed, the input waveguide 215 and the output waveguides 225 may be strip waveguides. The input waveguide 215 and the output waveguides 225 may be optically coupled to the slab waveguide 260 to reduce the loss of light at the interface of the waveguides.

Also shown in the expanded section of FIG. 2 are the reflective facets 250 of the diffraction grating 230. The expanded section of FIG. 2 is for illustrative and explanatory purposes and is not to scale. Additionally, although four reflective facets 250 are illustrated, the diffraction grating 230 may include any appropriate number of reflective facets 250. Each of the reflective facets 250 may be approximately equidistant from one another by a distance d. The reflective facets 250 of the diffraction grating 230 will be discussed with reference to FIGS. 4A-4C. Additionally, the optical component 200 may include an input waveguide 215 for emitting light 210 toward the diffractive grating 230 and the output light 220 may be received at output waveguides 225. As used herein, the term "reflective facets" may be used interchangeably with "grating mirrors," "grating facets," and "teeth."

The locations of the input waveguide 215 and the output waveguides 225 may depend at least partially on the radius of curvature of the diffraction grating 230. In some examples, the input waveguide 215 and the output waveguides 225 are located adjacent to the Rowland circle 240, and the Rowland circle 240 depends on the radius of curvature of the diffraction grating 230. Additionally, the reflective facets 250 of the diffraction grating 230 may determine the angle at which the input light reflects off of the diffraction grating 230 in conjunction with the radius of curvature of the diffraction grating 230. In turn, the angle at which the light reflects determines the location of the output waveguides 225 on the Rowland circle 240. Although the input and output waveguides are discussed as being located on the Rowland circle 240, in some examples, the input and output waveguides may not be located on the Rowland circle 240.

In FIG. 2, the input light 210 propagates in the slab waveguide 260. As the light propagates, this may be discussed herein as the light being emitted on an input light path or an optical path, where the terms "light path" and "optical path" may be used interchangeably. Similar to the input light, when the output light 220 propagates from the diffraction grating 230 through the slab waveguide 260, this may be described as the output light being received on an output light path.

Figure 3A:
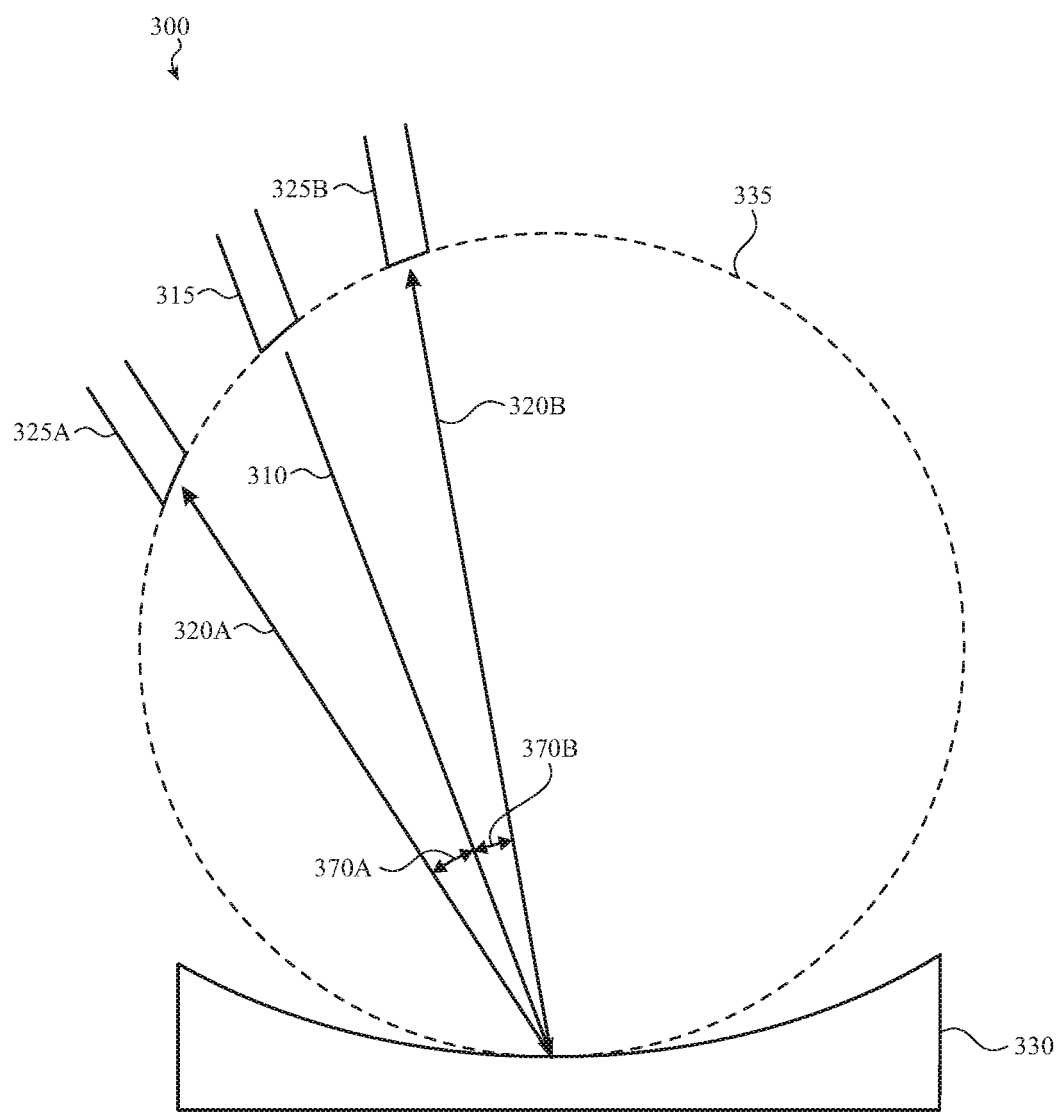
FIG. 3A illustrates an optical component with a diffraction grating.

FIG. 3A illustrates an optical component with a diffraction grating. FIG. 3A illustrates an optical component 300 with a diffraction grating 330 that receives input light 310 from an input waveguide 315. The input light 310 may propagate on an input light path to the diffraction grating 330 and reflect off of the diffraction grating 330 as output light 320. As shown in FIG. 3A, the output light 320 may propagate on two different output light paths and the output light 320A may be received by a first output waveguide 325A and the output light 320B may be received by a second output waveguide 325B. The two output waveguides 325 may be located on both sides of the input waveguide 315. Although a single input waveguide and two output waveguides are illustrated in FIG. 3A, any appropriate number of input and output waveguides may be used so long as the number of input waveguides is fewer than the number of output waveguides.

Angle 370A may be between the input light path 310 and the output light path 320A. Angle 370B may be between the input light path 310 and the output light path 320B. The angles 370A and 370B can depend on various factors including, but not limited to, the properties of the diffraction grating 330 (e.g., spacing of the reflective facets, radius of curvature of the diffraction grating, and so forth) and the wavelength of the input light 310. In the example of FIG. 3A, the optical component 300 functions as a de-multiplexer; the diffraction grating 330 may de-multiplex the input light 310 received from the input waveguide 315 by reflecting and separating the input light 310 into output light 320A and 320B. The diffraction grating 330 may reflect incoming light at different angles depending on the wavelength of light. The diffraction grating 330 may be used to separate light and direct the reflected light along the output paths 320A and 320B, where the reflected light on the output paths 320A and 320B may have different wavelength ranges that do not overlap. As previously discussed, the wavelengths of the input light 310 may be in a broadband wavelength range, the output light 320A may be in a first wavelength range, and the output light 320B may be in a second wavelength range, which may be separated from the first wavelength range by a separation wavelength band of at least 0.1 µm. In some examples, the separation wavelength band may be more or less than 0.1 µm. Although the diffraction grating 330 is discussed herein as reflecting light, it may be understood that the reflective facets of the diffraction grating reflect the light.

In some example embodiments, a "broadband wavelength range" may be generally a set of emitted broadband wavelengths and/or detected broadband wavelengths over the approximate range of 1 µm. In some examples, the 1 µm emitted and/or detected broadband wavelengths may be in the "broadband" range of approximately 1.0 µm and 3.0 µm. Accordingly, embodiments described herein may operate over, or employ, an operating range that may correspond to, or be encompassed in, a broadband wavelength range. Examples of such operating ranges include 1.0 µm-2.0 µm, 1.3 µm-2.3 µm, 1.4 µm-2.4 µm, 1.5 µm-2.5 µm, and so forth. Although specific wavelength ranges may be discussed, any appropriate wavelength or wavelength range may be emitted and/or detected by the photonics elements described herein, depending on the use and construction of those elements.

In some examples, the diffraction grating 330 may be an Echelle grating. The Echelle grating may be designed to have a reduced footprint size by leveraging the wavelength separation between the first wavelength band and the second wavelength band. With the separation between wavelength bands, the optical component 300 may include separate waveguides which may be coupled to separate detectors for detecting the different wavelength bands. For example, as shown in FIG. 3A, a first detector can be coupled to the first output waveguide 325A for detecting output light 320A and a second detector can be coupled to the second output waveguide 325B for detecting output light 320B. Light path 320A may include the first wavelength band, and light path 320B may include the second wavelength band.

An Echelle grating may be multi-functional and used for either one or both of diffraction and refocusing of the input light. The multi-functional diffraction grating can lead to a reduction in the grating size and the overall optical device size, but in some examples this may lead to the possible locations of the input and output waveguides being reduced. By separating the output wavelength bands using the multi-functional diffraction grating, the location options of the input waveguide 315 and the output waveguides 325 can increase.

In FIG. 3A, the input waveguide 315 is positioned at a first location on or near the Rowland circle, and the first output waveguide 325A is positioned at a second locations on or near the Rowland circle. In the example of FIG. 3A, the first location of the input waveguide 315 is between the second and third locations of the second and third waveguides 325A and 325B, respectively, on or near the Rowland circle 335.

The radius of curvature of the diffraction grating 330 and thus, the radius of the Rowland circle 335 can be selected by considering one or more of: the angles 370, the location of the input waveguide 315, and the location of the output waveguides 325. By placing the input waveguide 315 between the output waveguides 325 (or vice versa in the example of FIG. 3B), the radius of the Rowland circle 335 can be reduced, which may allow for a smaller-sized optical component 300.

In addition to reducing the footprint size, the diffraction grating design may be configured to improve optical performance. In some examples, the optical performance may be improved by reducing the optical loss of the optical component 300. In FIG. 3A, by locating the input waveguide 315 between the output waveguides 325, the angles 370 may be reduced, which may result in a reduction of optical losses. In some examples, the angle 370A is substantially similar (e.g., equal or within a five percent deviation) to the angle 370B, where the angle 370A is associated with the optical losses and phase errors associated with the first wavelength band and the angle 370B is associated with the optical losses and phase errors associated with the second wavelength band. Thus, the optical losses can be balanced and the likelihood of the longer wavelength band experiencing a higher optical loss relative to the shorter wavelength band may be reduced. In addition to balancing the optical losses between the two different wavelength bands, reducing the angles 370 can lead to less undirected, scattered light. A smaller angle 370 can allow the input light 310 to be incident on the reflective facets of the diffraction grating 330 at higher angles. This will be discussed in further detail with reference to FIGS. 4A-4C.

Figure 3B:
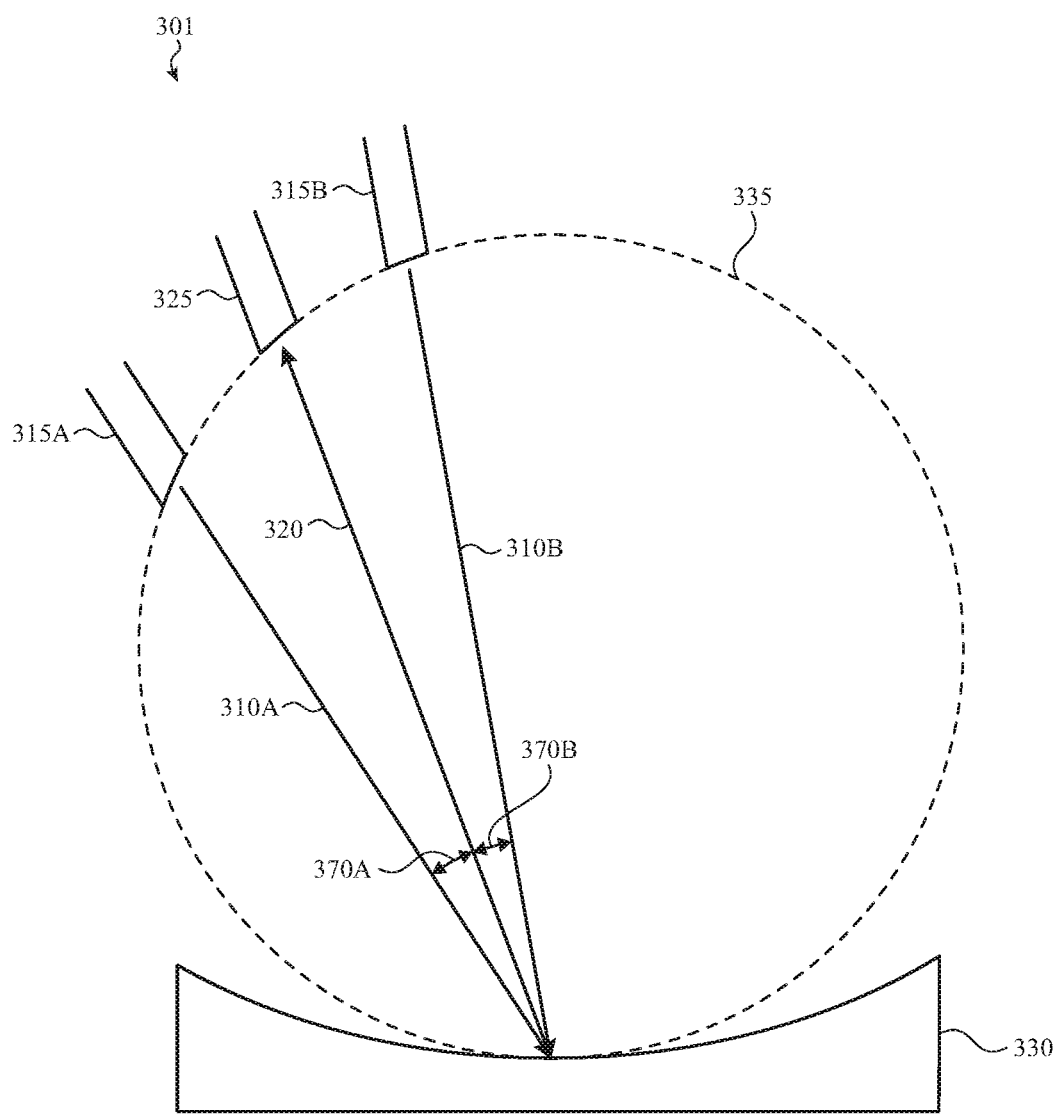
FIG. 3B illustrates an optical component with a diffraction grating.

FIG. 3B illustrates an optical component with an Echelle grating. The optical component 301 of FIG. 3B is similar to the optical component 300 of FIG. 3A, except for the positioning of the input waveguides 315A and 315B with respect to the output waveguide 325. In FIG. 3B, the output waveguide 325 is positioned between the input waveguides 315A and 315B. For the purposes of discussion, similarly numbered elements may have similar characteristics and functionality. In FIG. 3B, the optical component 301 is a multiplexer and the diffraction grating 330 can combine light 310A and 310B from input waveguides 315A and 315B to provide output light 320 to the output waveguide 325. In some examples, the diffraction grating 330 can be used to multiplex (e.g., combine) light having multiple wavelengths or wavelength ranges. Although FIG. 3B illustrates two input waveguides and a single output waveguide, in other multiplexer examples, any appropriate number of input waveguides and output waveguides may be used so long as there are fewer output waveguides than input waveguides.

In some examples, the diffraction grating 330 of FIG. 3B may be an Echelle grating. An Echelle grating may be particularly suitable for generating higher diffractive orders of light due to the nature of the periodic structure of the reflective facets (the reflective facets are not illustrated in FIG. 3B). The reflective facets will be discussed in further detail with reference to FIGS. 4A-4C. In some examples, Echelle gratings may provide high dispersion having a small footprint size.

Figure 4A:
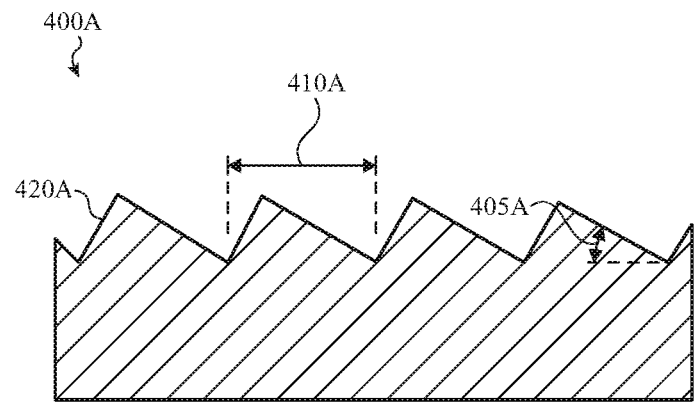
FIGS. 4A-4C illustrate reflective facets of a diffraction grating.
Figure 4B:
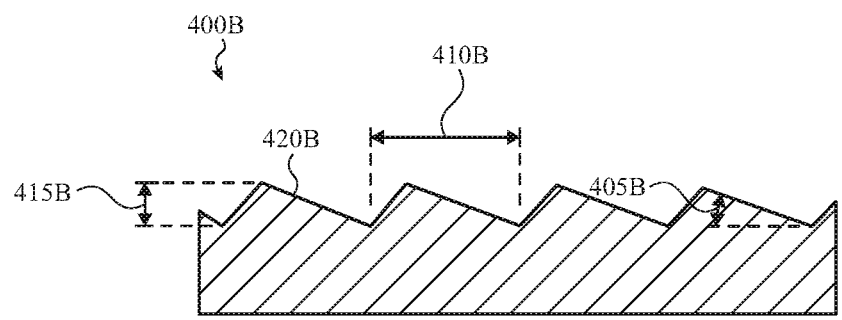
Figure 4C:
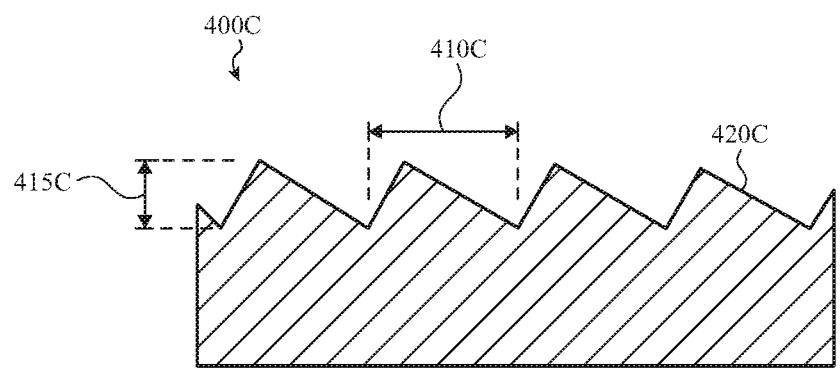

FIGS. 4A-4C illustrate reflective facets of a diffraction grating. In FIG. 4A, the reflective facets 410A of the diffraction grating 400A may include different features which may be varied depending on the desired optical performance. The varied features may include the periodicity of the reflective facets, the height of the reflective facets, the blaze angle, the length of both sides of the reflective facets, and so forth. The blaze angle 405A may be the angle of the reflective facet of the diffractive grating measured relative to the plane of incidence. In some examples, the reflective facets 410A of a diffraction grating 400A can have a low period 420A where the adjacent reflective facets 410A can be widely spaced from one another. In some examples, the diffraction grating 400A may have reflective facets 410A with a high-blaze angle 405A.

As shown in FIG. 4B, reflective facet angle 405B is lower than reflective facet angle 405A of FIG. 4A. In FIG. 4B, light with higher angles of incidence can allow for a lower facet angle without compromising optical performance such as diffraction efficiency. Additionally, the reflective facet width 410B can be greater than the reflective facet width 410A. The reflective facet width 410 may also be generally referred to as the period or periodicity of the grating 400. A wider reflective facet period 410B can lead to easier fabrication of the diffractive grating 400B. As one example, the reflective facet period 410B can be approximately 3.18 μm for the grating 400B, whereas the reflective facet period 410A can be approximately 0.57 μm for the diffractive grating 400A.

In some examples, a wider reflective facet width 410B can result in less rounding of the corners of the grating teeth during fabrication processes. Reducing the amount of rounding of the corners of the grating teeth can result in reducing the amount of undirected, scattered light. In some examples, the rounded corners may cause unwanted, large fluctuations in the optical losses. In some examples, the diffraction grating 400B may be able to tolerate rounded corners when the reflective facet width 410B is larger. Further, in some examples, the reflective facet width 410B may be related to the targeted reflected wavelength or ranges of wavelengths. For example, the reflective facet width 410B may be increased to accommodate an increased target wavelength or range of wavelengths.

In some examples, the size of the optical component may be balanced with the optical performance. For example, the diffractive grating design may not be based solely on the lowest possible reflective facet angle and the allowable size of the diffraction grating 400B. Other factors may be considered such as the complexity of the fabrication, as discussed herein.

In some examples, the diffraction grating 400B may have a selected blaze angle 405B and the dispersion of light may be related to the blaze angle. In some instances, when the angle between the input light and a ray of normal incidence to the reflective facet is approximately equal to the blaze angle, light at a certain grating order may have improved diffraction efficiency.

In FIG. 4C, the height 415C of the reflective facets 410C of the diffraction grating 400C may be greater than the reflective facet height 415B of the diffraction grating 400B of FIG. 4B. In some instances, tuning the blaze angle and the grating order of the output light can allow for taller reflective facets.

In some examples, the larger height 415C can reduce the complexity of the fabrication of the diffraction grating 400C. As one example, the height 415C can be approximately 0.547 μm for the diffraction grating 400C, whereas the height 415B can be approximately 0.275 μm for the diffraction grating 400B. Because the blaze angle is related to the angle between the input light and the output light, the angle between the input and output light may be used to select the height 415C.

In some examples, the angle between the input and output light may be tuned such that the optical loss associated with the first wavelength band (e.g., of a first input light path) can be similar to the optical loss associated with the second wavelength band (e.g., of the second input light path). In some examples, the diffracted output light may overlap with the input light, which may help reduce imaging problems specific to optical components that use broadband wavelength ranges of light.

Figure 5A:
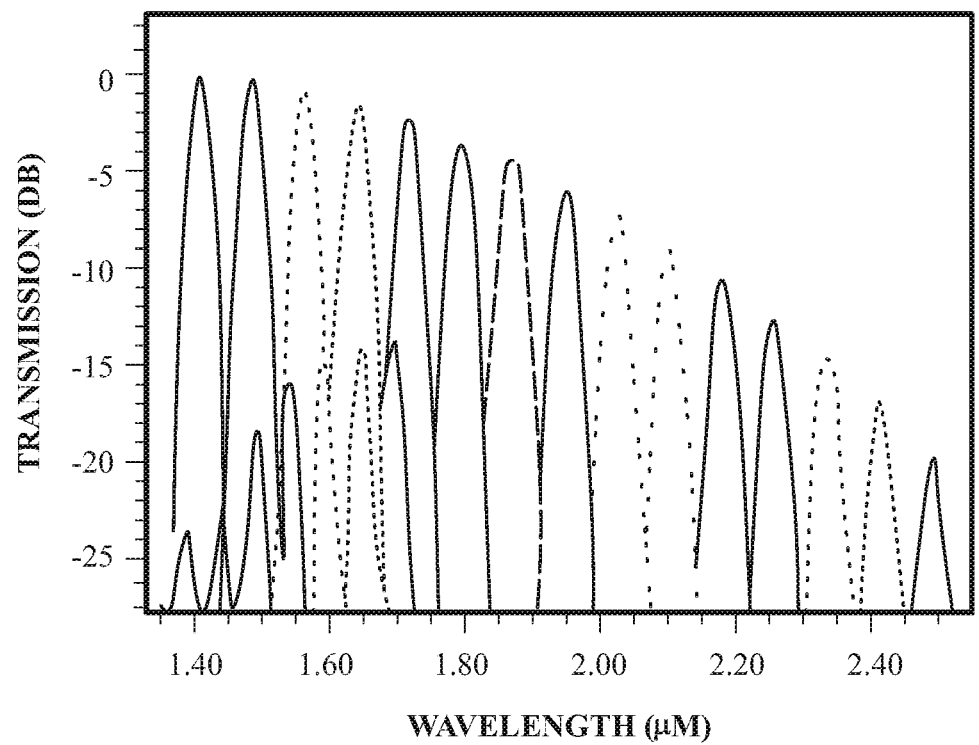
FIGS. 5A and 5B illustrate spectrum plots at different blaze angles.
Figure 5B:
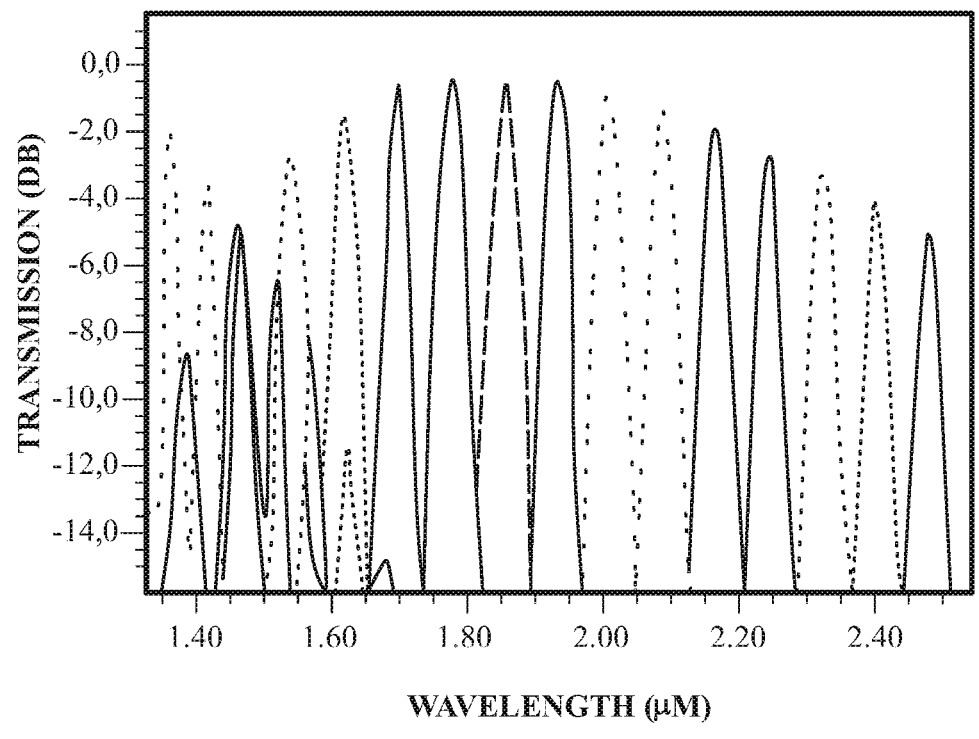

FIGS. 5A and 5B illustrate sample spectrum plots at different blaze angles. The spectrum plot of FIG. 5A is representative of a blaze angle of approximately 3.5° and the spectrum plot of FIG. 5B is representative of a blaze angle of approximately 4.7°. In some examples, the blaze angle may be tuned such that the power of the input light can be balanced (e.g., have a small dynamic range) across multiple wavelengths of both the first wavelength band and the second wavelength band, which may be spaced apart from the first wavelength band by at least 0.1 μm and generally in the broadband wavelength range as described herein. It should be understood that the spectrum plots of FIGS. 5A and 5B are illustrative rather than intended to show particular or limiting information.

The power of the light for the first wavelength band relative to the second wavelength band may differ more with a smaller blaze angle than with a larger blaze angle, so the larger angle may be selected such that the difference in the output light transmissions between the first wavelength band (of the first input light) and the second wavelength band (of the second input light) is reduced. In some examples, the average transmission of the first wavelength band may be equal to the average transmission of the second wavelength band.

In some examples, the diffraction grating may have blaze angles to reflect light such that an optical separation is maintained between an input waveguide (e.g., to a laser) and an output waveguide (e.g., to a detector). Without the optical separation, the waveguides may be subject to optical coupling that can lead to unwanted effects such as the self-mode of light in the input waveguide competing with a lasing mode. The self-mode of light in the input waveguide may be due to light reflecting from the diffraction grating that may return to the input waveguide and can cause self-mode lasing.

In some examples, the wavelengths received at the output waveguide(s) can be associated with a lower level of granularity such that the wavelength band between 2.0 µm-2.1 µm may be extracted. A lower level of granularity can refer to a large spacing between wavelengths so that a signal may be detected at the output waveguide(s). In some examples, the angles between the input waveguide(s) and the output waveguide(s) may be related to the extracted wavelength band.

The optical performance of the diffraction grating may be sensitive to the quality of the fabrication and the grating material and the fabrication of the diffraction grating may present challenges, especially when the reflective facet width and/or height of the teeth are small. For example, variations and imperfections of the reflect facet of the diffraction grating can lead to phase errors, optical crosstalk, variations in the path lengths of the returned light, variations in the scattering, or the like. In addition to or instead of configuring the diffraction grating design in consideration of the size of the optical component and the optical performance, other considerations may include fabrication costs, yield, and complexity.

Figure 6:
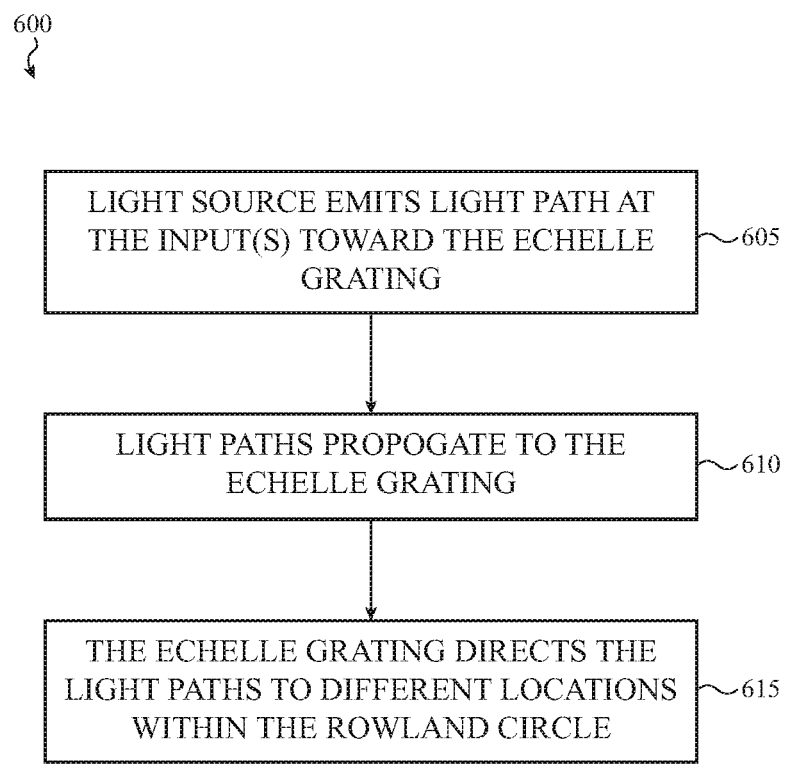
FIG. 6 illustrates a process flow for operating an optical component.

FIG. 6 illustrates a process flow for operating a diffraction grating. At operation 605 of process 600, the light source may emit light towards the diffraction grating. The wavelength range of the input light may be a broadband wavelength range as described herein. At operation 610, the light can propagate in a planar waveguide to the diffraction grating. In some examples, the input light may be emitted into the planar waveguide using a strip waveguide which may be located on or near the Rowland circle. At operation 615, the diffraction grating may reflect the light to a first and second waveguide, which may be near or on the Rowland circle. In some examples, the reflected light may be separated into two wavelength bands that are separated by approximately 0.1 µm.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. An optical device, comprising:
   a planar waveguide defining an input light path;
   an input waveguide configured to emit light along the input light path;
   a set of grating facets configured to:
      receive the emitted light from the input waveguide; and
      reflect the emitted light as a first reflected light and a second reflected light;
   a first output waveguide defining a first reflected light path and configured to receive the first reflected light along the first reflected light path; and
   a second output waveguide defining a second reflected light path and configured to receive the second reflected light along the second reflected light path, wherein:
      the first reflected light is a first wavelength of light reflected at a first angle and to the first output waveguide;
      the second reflected light is a second wavelength of light reflected at a second angle and to the second output waveguide; and
      a power distribution of the first wavelength range of light received by the first output waveguide and the second wavelength range of light received by the second output waveguide is based at least in part on a blaze angle of the set of grating facets.

2. The optical device of claim 1, wherein the input waveguide is located between the first output waveguide and the second output waveguide.

3. The optical device of claim 1, wherein the emitted light is in a broadband wavelength range of at least one µm.

4. The optical device of claim 1, wherein:
   the first reflected light is in a first wavelength range; and
   the second reflected light is in a second wavelength range spaced apart from the first wavelength range by at least 0.1 µm.

5. The optical device of claim 1, wherein:
   the input waveguide is located at a first position on a Rowland circle;
   the first output waveguide is located at a second position on the Rowland circle; and
   the second output waveguide is located at a third position on the Rowland circle.

6. The optical device of claim 1, wherein the first angle is equal to the second angle.

7. The optical device of claim 1, wherein:
   the first angle is between the input light path and at least one of first or second output light paths; and
   the first angle is selected such that an optical loss associated with the first wavelength range of light is equal to an optical loss associated with the second wavelength range of light.

8. An optical device, comprising:
   a first light emitting element configured to emit a first input light along a first input light path and positioned at a first location on a Rowland circle;
   a second light emitting element configured to emit second input light along a second input light path;
   a light receiving element configured to receive reflected light along a reflected light path and positioned at a second location on the Rowland circle and between the first light emitting element and the second light emitting element; and
   a diffraction grating configured to:
      receive light along the input light path of the light emitting element; and
      reflect light along the reflected light path to the light receiving element.

9. The optical device of claim 8, wherein:
   the reflected light path is a first reflected light path;

the light receiving element is a first light receiving element;

the optical device further comprises a second light receiving element configured to receive reflected light along a second reflected light path; and at least a subset of a set of grating mirrors is configured to receive light in a first wavelength band of light, the first wavelength band of light comprising:
  a second wavelength band of light reflected along the first reflected light path to the first light receiving element; and
  a third wavelength band of light separated from the second wavelength band of light, the third wavelength band of light reflected along a third reflected light path to the second light receiving element; and
the input light path is located between the reflected light path and the second reflected light path.

10. The optical device of claim 9, wherein the second wavelength band of light and the third wavelength band of light have approximately equal average transmission powers.

11. The optical device of claim 9, wherein the second wavelength band of light is spaced apart from the third wavelength band of light by at least 0.1 µm.

12. The optical device of claim 8, wherein the diffraction grating is an Echelle grating.

13. The optical device of claim 8, wherein the second wavelength band of light and the third wavelength band of light are separated by a separation wavelength band.

14. The optical device of claim 8; wherein:
the light receiving element is a first light receiving element;
the reflected light path is a first reflected light path;
the reflected light is a first reflected light; and
the optical device further comprises a second light receiving element configured to receive second reflected light on a second reflected light path.

15. The optical device of claim 8, further comprising:
the light receiving element is a first light receiving element;
the reflected light path is a first reflected light path;
the reflected light is a first reflected light; and
the optical device further comprises:
  a second light receiving element configured to receive second reflected light on a second reflected light path, wherein the first light receiving element and the second light receiving element are both located on a first side of the light emitting element.

16. The optical device of claim 8, further comprising a doped material positioned between the light emitting element and the light receiving element.

17. A method for splitting light, comprising:
emitting light in a broadband wavelength range from a first position on a Rowland circle;
reflecting the light from an Echelle grating in the broadband wavelength range;
receiving a first reflected light in a first wavelength band of the broadband wavelength range and at a second position on the Rowland circle; and
receiving a second reflected light in a second wavelength band of the broadband wavelength range and at a third position on the Rowland circle, the second wavelength band separated from the first wavelength band by at least 0.1 µm, wherein the first position on the Rowland circle is between the second position and the third position.

18. The method of claim 17, wherein emitting light comprises:
emitting light on an optical path between a first reflected optical path and a second reflected optical path.

* * * * *